United States Statutory Invention Registration [19]

[11] Reg. Number: H15

Chraplyvy

[45] Published: Jan. 7, 1986

[54] BROADBAND SOURCE OF PICOSECOND RADIATION

[75] Inventor: Andrew R. Chraplyvy, Matawan, N.J.

[73] Assignee: AT&T Bell Laboratories, Murray Hill, N.J.

[21] Appl. No.: 479,747

[22] Filed: Mar. 28, 1983

[51] Int. Cl.[4] ..... H01S 3/30

[52] U.S. Cl. ..... 372/3; 372/6; 372/23; 372/92; 372/51; 307/426

[58] Field of Search ..... 372/6, 3, 92, 23, 51; 307/426

[56] References Cited

U.S. PATENT DOCUMENTS

| | | | |
|---|---|---|---|
| 3,657,554 | 4/1972 | Lumpkin et al. | 307/426 |
| 3,705,992 | 12/1972 | Ippen et al. | 307/88.3 |
| 3,793,541 | 2/1974 | Ashkin et al. | 307/88.3 |
| 3,869,618 | 3/1975 | Lax et al. | 307/426 |
| 4,107,544 | 8/1978 | Kildal et al. | 307/426 |
| 4,218,628 | 8/1980 | Harris | 307/426 |
| 4,349,907 | 9/1982 | Campillo et al. | 372/92 |

OTHER PUBLICATIONS

Laubereau et al., "Intense Tunable Picosecond Pulses in the Infrared" *Appl. Phys. Lett. vol. 25, No. 1, Jul. 1974.*

Chraplyvy et al., "Infrared Generation by Means of Multiple-Order Stimulated Raman Scatt. in $CCl_4$-and $CBrCl_3$-filled Hollow Silica Fibers", *Opt. Lett. vol. 6, No. 12, Dec. 1981.*

Ishida et al., "Tunable Subpicosecond Pulse Gen. from 535 to 590-nm by a Hybridly Mode-Locked Dye Laser", *Jap. Jour. App. Phys. vol. 21, No. 5, May 1982.*

Tanaka et al., "Gen. of Tunable Picosecond Pulses in the Ultraviolet Region Down to 197 nm"; *Opt. Comm. vol. 41, No. 6, May 15, 1982.*

Yasa et al., "Highly Efficient Widely Tunable Subpicosecond Double Mode-Locked Laser", *Opt. Comm. vol. 24, No. 4, Jul. 15, 1982.*

Klein et al., "High Peak Power Picosecond Light Pulses from a Directly Modulated Semiconductor Laser"; *App. Phys. Lett. vol. 41, No. 5, Sept. 1, 1982.*

Driscoll et al., "Gen. of Synchronous Continuously Tunable High-Power Picosecond Pulses", *Rev. Sci. Instrum, vol. 53, No. 10, Oct. 1982.*

Bridges et al., "Broadband Infrared Generation in Liquid Bromine-Core Optical Fibers", *Opt. Lett. vol. 7, No. 11, Nov. 1982.*

*Primary Examiner*—S. C. Buczinski
*Assistant Examiner*—Linda J. Wallace
*Attorney, Agent, or Firm*—Wendy W. Koba

[57] ABSTRACT

The present invention relates to a means for generating a broadband source of picosecond radiation in the visible and near-infrared spectral regions. In operation, picosecond pulses with wavelength λ are supplied by a laser pump source (10) and injected into the liquid core of a single mode optical fiber (18). A broadband continuum is generated in the liquid core by two mechanisms. Stimulated Raman scattering in the liquid core of the optical fiber shifts the wavelength of the incoming radiation by an amount equal to the energy of the vibrations in the liquid molecules, where with sufficient power, multiple shifts are possible. In addition, the pump radiation and the shifted radiation are broadened by self-phase modulation thereby "filling" the region between the discrete shifted lines. The output radiation from the optical fiber is, therefore, a broadband tunable picosecond pulse source.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BROADBAND SOURCE OF PICOSECOND RADIATION

BACKGROUND OF THE INVENTION

1. Field of the Invention

The present invention relates to a broadband source of picosecond radiation and, more particularly, to a tunable broadband source of picosecond radiation formed with only a picosecond pulse source and a liquid core single mode optical fiber.

2. Description of the Prior Art

Tunable picosecond sources in the visible and near infrared spectral regions are needed for optical fiber diagnostics, device characterization, and the study of semiconductor physics. Also, the generation of infrared picosecond pulses has received increasing attention over the last several years, principally for optical communications, the investigation of multiple-photon absorption and vibrational energy transfer processes in molecules, and for laser fusion. Picosecond pulses have been generated in the infrared region (1.3–3.6 micrometers) in the past using 1.06 μm optically pumped lithium niobate optical parametric devices in the traveling wave mode, as disclosed in the article "Intense Tunable Picosecond Pulses in the Infrared" by Laubereau et al appearing in *Applied Physics Letters*, Vol. 25, No. 1, July 1974 at pp. 87 et seq.

A recent arrangement for generating picosecond pulses is disclosed in U.S. Pat. No. 4,349,907 issued to A. J. Campillo et al. on Sept. 14, 1982. As disclosed, intense 1.064 μm picosecond pulses pass through a 4.5 cm long $LiNbO_3$ optical parametric oscillator crystal set at its degeneracy angle. A broadband picosecond output pulse emerges, and a simple grating and mirror arrangement is used to inject a selected narrow-band pulse into a 2 cm long $LiNbO_3$ optical parametric amplifier crystal along a second pump line. Typical input energies at 1.064 μm along both pump lines are 6–8 mJ for the oscillator and 10 mJ for the amplifier. This yields 1 mJ of tunable output in the range 1.98 to 2.38 μm which when down-converted in a 1 cm long CdSe crystal mixer gives 2 μj of tunable radiation over the 14.8 to 18.5 μm region. The bandwidth and wavelength of both the 2 and 16 μm radiation output are controlled solely by the diffraction grating. Although the above-described arrangement is capable of generating tunable picosecond pulses, the arrangement is complicated, expensive, and too involved to become useful outside the laboratory environment.

Yet another arrangement for generating such pulses is discussed in the article "Tunable Subpicosecond Pulse Generation for 535 to 590-nm by a Hybridly Mode-Locked Dye Laser", by Y. Ishida et al appearing in the *Japanese Journal of Applied Physics*, Vol. 21, No. 5, May, 1982 at pp. L312–L314. Here, tunable subpicosecond pulses are stable generated in the above-cited wavelength range for a cw mode-locked dye laser system using rhodamine 110 and disodium fluorescein active dyes, employing combined passive and synchronous mode-locking. A minimum pulse width as short as 0.25 ps has been achieved with this arrangement at approximately 560 nm. As disclosed, however, this arrangement appears to comprise a limited range of tunability.

The problem remaining in the prior art, therefore, is to provide a means for generating picosecond and subpicosecond pulses which provides a wide range of tunability without requiring an inordinately complicated arrangement.

SUMMARY OF THE INVENTION

The problem remaining in the prior art has been solved in accordance with the present invention, which relates to a broadband source of picosecond radiation and, more particularly, to a tunable broadband source of picosecond radiation formed with only a picosecond pulse source and a liquid core single mode optical fiber.

An aspect of the present invention relates to a means for generating a broadband source of picosecond radiation in the visible and near-infrared spectral regions. In operation, picosecond pulses with wavelength λ are supplied by a laser pump source and injected into the liquid core of a single mode optical fiber. A broadband continuum is generated by two mechanisms. Stimulated Raman scattering in the liquid core of the optical fiber shifts the wavelength of the incoming radiation by an amount equal to the energy of the vibrations in the liquid molecules. In addition, the pump radiation and the shifted radiation are broadened by self-phase modulation thereby "filling" the region between the discrete shifted lines. The output radiation from the optical fiber is, therefore, a broadband picosecond pulse tunable as a function of the input pulse power.

Another aspect of the present invention is to provide a synchronously-pumped source of picosecond pulse radiation by the inclusion of mirrors on opposite ends of the single mode optical fiber, where the spacing between the mirrors is adjusted to achieve the synchronous operation.

Other and further aspects of the present invention will become apparent during the course of the following description and by reference to the accompanying drawings.

BRIEF DESCRIPTION OF THE DRAWINGS

Referring now to the drawings, where like numerals represent like parts in several views.

DETAILED DESCRIPTION

Figure 1:
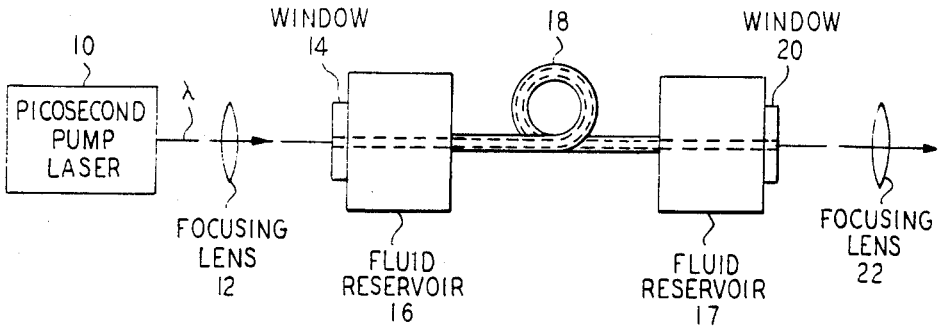
FIG. 1 illustrates an exemplary single-pass arrangement of the present invention for producing broadband picosecond pulses.

An exemplary arrangement capable of producing broadband picosecond pulses formed in accordance with the present invention is illustrated in FIG. 1. As shown, a picosecond pulse source 10 generates a pulse with a predetermined wavelength λ, one exemplary arrangement for producing picosecond pulses being a pump laser disclosed in U.S. Pat. No. 3,657,554 issued to O. J. Lumpkin et al on April 18, 1972. The output of pulse source 10 is subsequently passed through a focusing lens 12, for example, a $CaF_2$ lens, and is applied as an input to a hollow-core optical fiber 18.

As shown in FIG. 1, fiber 18 is coupled via an input window 14 to a pair of fluid reservoirs 16 and 17. The fluid in fluid reservoirs 16 and 17 fill the core of fiber 18, by either capillary action or from a pressure cell, and is capable of reacting with the pulses propagating through fiber 18. Fiber 18 subsequently passes through an output window 20 positioned at the exit from fluid reservoir 17, where output window 20, like input window 14, may comprise $CaF_2$. The output pulse stream in the fluid core of fiber 18 is subsequently passed through a focusing lens 22 in order to form a sufficiently collimated output pulse.

To avoid pulse broadening via modal dispersion, fiber 18 must be a single mode fiber. This may be achieved when the liquid core satisfies the following condition $$\frac{\pi D}{\lambda}(n_L^2 - n_C^2)^{\frac{1}{2}} \lesssim 2.4 \quad (1)$$

where D is the core diameter, $n_L$ is the refractive index of the liquid core, and $n_C$ is the refractive index of fiber 18. One exemplary liquid medium capable of providing single mode action is 90% $CCl_4$–10% $CBrCl_3$, which may be used to fill the hollow core of fiber 18.

The broadband continuum generated as the output of the present invention results from two separate mechanisms. First, stimulated Raman scattering in the liquid-filled core of fiber 18 shifts the wavelength of the incoming pulse by an amount equal to the vibrational energy of the liquid molecules contained in the fluid core of fiber 18. For example, if the liquid is $CCl_4$, the shift would be equal to 459 $cm^{-1}$. If the input power from pulse source 10 is strong enough, multiple shifts are possible. In addition to the stimulated Raman scattering, the pump radiation and the shifted radiation are broadened by self-phase modulation, thereby "filling" the region between the discrete shifted lines.

Figure 2:
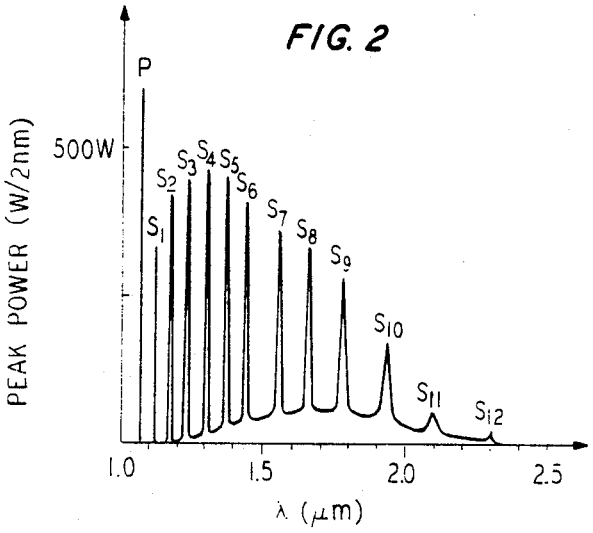
FIG. 2 contains a graph illustrating the spectral emission of a $CBrCl_3$-filled hollow fiber excited by picosecond pulses in accordance with the present invention.

A spectral emission illustrating both the stimulated Raman scattering and the broadband radiation filling between the Stokes orders related to self-phase modulation are illustrated in FIG. 2 for a picosecond pulse source formed in accordance with the present invention, where liquid $CBrCl_3$ was employed as the Raman medium for a fiber 300 cm long with a 12 micrometer core diameter. The pump pulse from pulse source 10 is denoted by the letter P, and the various Stokes orders related to the Raman scattering are denoted $S_1$–$S_{12}$. As can be seen by reference to FIG. 2, self-phase modulation fills in the spectral regions between the various Stokes pulse emissions in accordance with the present invention.

Figure 3:
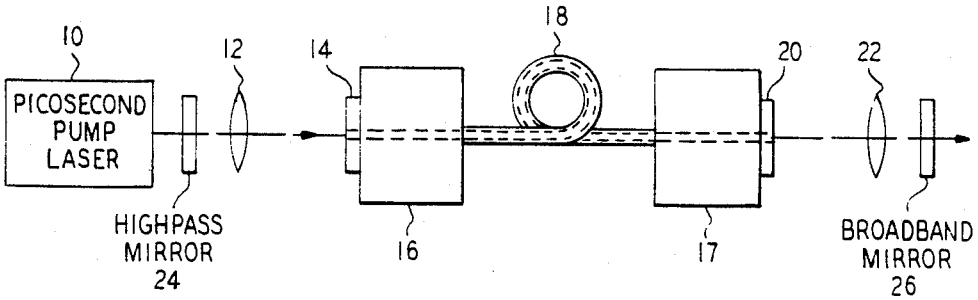
FIG. 3 illustrates an alternative embodiment of the present invention which is capable of operating in a synchronously-pumped mode.

An alternative embodiment of the present invention which is capable of operating in a synchronously-pumped mode is illustrated in FIG. 3. As shown, the arrangement is identical to that illustrated in FIG. 1, with the addition of a short-wavelength passing mirror 24 between pulse source 10 and focusing lens 12, and a broadband mirror 26 positioned after focusing lens 22. In this embodiment of the pesent invention, picosecond pulse source 10 is configured to produce pulses separated by a predetermined time interval $\tau$, where $\tau$ is typically several nanoseconds. The pulses enter fluid reservoir 16 by passing through short-wavelength passing mirror 24, where highpass mirror 24 functions to pass the pump wavelength but reflect the Raman shifted (lower-frequency) radiation, $S_1$–$S_{12}$, which results from the interaction with the fluid in the core of optical fiber 18. The reflected Raman radiation is focused with the incoming higher frequency radiation by focusing lens 12 and subsequently enters the core of fiber 18.

The output from fiber 18 passes through focusing lens 22 and subsequently through broadband mirror 26, where the transmission through broadband mirror 26 is, for example, several percent. The radiation reflected by broadband mirror 26 is focused back into fluid reservoir by focusing lens 22, where it passes therethrough and again impinges upon mirror 24. By adjusting the mirror spacing, a pulse of the Raman shifted radiation, after making two passes through the fiber, can be made to arrive at highpass mirror 24 at the same time that the next pump pulse from pump source 10 passes through mirror 24. The combination of the pulse from pump source 10 and the reflected Raman shifted pulse once again will traverse fiber 18 and initiate both stimulated Raman scattering and self-phase modulation, as described hereinabove in association with FIG. 1. The arrangement illustrated in FIG. 3, by virtue of the synchronously-pumped configuration, includes a large increase in effective pump power over prior art arrangements due to the synchronization between the recirculated Raman shifted pulses and the newly arrived pulses from pump source 10.

Therefore, the arrangement of the present invention described hereinabove in association with FIG. 3, has the advantage of requiring only low pump power, since the nonlinear liquid medium acts as a waveguide, thereby significantly increasing the related interaction lengths. Also, greater broadband coverage of the visible and infrared regions are possible again due to the large interaction lengths afforded by the waveguide geometry inherent in the liquid-core fiber structure. Lastly, the high gains attributable to the liquid included in the fiber core allows the use of shorter lengths of fiber than that employed in prior art devices and, therefore, allows the extension of the teachings of the present invention to generating broadband subpicosecond pulses.

What is claimed is:

1. Apparatus for producing broadband pulse radiation comprising an input pump laser picosecond pulse source for providing a sequence of laser pulses at a predetermined wavelength; and optical fiber means coupled to said input laser pulse source wherein said optical fiber means comprises a predetermined diameter D, a first index of a refraction $n_C$, and a core region including a liquid medium of molecules having a predetermined vibrational energy, said liquid medium having a second index of refraction $n_L$, wherein said first and said second indices of refraction satisfy the relation $$\frac{\pi D}{\lambda}(n_L^2 - n_C^2)^{\frac{1}{2}} \lesssim 2.4$$

so that said optical fiber means comprises a single mode optical fiber means, said liquid medium capable of inducing stimulated Raman scattering in said sequence of laser pulses for shifting said sequence of laser pulses to wavelengths related to the predetermined vibrational energy of the molecules , thus forming as a first output of said apparatus a Raman shifted sequence of pulse radiation, said sequence of laser pulses also combining in said core region with said Raman shifted sequence of pulse radiation to produce as a second output of said apparatus a continuum source of radiation at wavelengths other than those associated with said Raman shifted sequence, the combination of said first output and said second output thus being defined as broadband pulse radiation.

2. Apparatus formed in accordance with claim 1 wherein said apparatus further comprises a first mirror located between the input laser pulse source and the optical fiber means, said first mirror being capable of transmitting the sequence of laser pulses provided by said input laser pulse source and reflecting both the Raman shifted sequence of pulses and continuum source of radiation formed in the core region of said optical fiber means; and a second mirror located at the output of said optical fiber means capable of reflecting a first portion of the broadband pulse radiation and transmitting a second portion of said broadband pulse radiation produced by said optical fiber means, the reflected portion of said broadband pulse radiation capable of combining with both the input sequence of laser pulses and the Raman shifted sequence of pulses to maintain a synchronously pumped output of broadband pulse radiation.

3. Apparatus formed in accordance with claim 1 wherein the optical fiber means comprises a fluid reservoir for containing a fluid medium exhibiting a first index of refraction $n_C$ and capable of causing stimulated Raman scattering in the input sequence of laser pulses;

a hollow-core optical fiber exhibiting a second index of refraction $n_L$ embedded in the fluid reservoir so that the fluid medium fills the core region of said hollow-core optical fiber;

an input window disposed on a first surface of said fluid reservoir in a manner whereby said input sequence of laser pulses passes through said input window and propagates through said core region of said hollow-core fiber; and an output window disposed on a second surface of said fluid reservoir in a manner whereby the combination of the Raman shifted sequence of pulse radiation and the continuum source of radiation are capable of passing therethrough as the broadband pulse radiation output of said optical fiber means.

4. Apparatus formed in accordance with claim 1 wherein the apparatus further comprises a first focusing lens disposed between the input pulse source and the optical fiber means; and a second focusing lens disposed in the path of the output broadband pulse radiation sequence produced as an output of said optical fiber means.

5. Apparatus formed in accordance with claim 1 wherein the liquid medium comprises 90% $CCl_4$ and 10% $CBrCl_3$.

* * * * *